United States Patent [19]

Muramatsu

[11] Patent Number: 5,490,349
[45] Date of Patent: Feb. 13, 1996

[54] INSECT TRAP WITH LIQUID ATTRACTANT

[76] Inventor: Scott Muramatsu, 13311 SE. Beech, Milwaukie, Oreg. 97222

[21] Appl. No.: 127,314

[22] Filed: Sep. 27, 1993

[51] Int. Cl.⁶ ..................................................... A01M 1/02
[52] U.S. Cl. ................................................ 43/122; 43/121
[58] Field of Search ............................ 43/131, 122, 121, 43/107, 113

[56] References Cited

U.S. PATENT DOCUMENTS

| | | | |
|---|---|---|---|
| 521,219 | 6/1894 | Peltier | 43/122 |
| 818,836 | 4/1906 | Lenthier | 43/122 |
| 823,718 | 6/1906 | Freimann | 43/122 |
| 1,007,931 | 11/1911 | Depner | 43/122 |
| 1,018,277 | 2/1912 | Suhre | 43/122 |
| 4,244,135 | 1/1981 | Harwoods | 43/122 |
| 4,316,344 | 2/1982 | Carlsen | 43/121 |
| 4,400,903 | 8/1983 | Seidenberger | 43/122 |
| 4,551,941 | 11/1985 | Schneidmiller | 43/122 |
| 4,899,485 | 2/1990 | Schneidmiller | 43/122 |
| 5,231,792 | 8/1993 | Warner | 43/122 |

FOREIGN PATENT DOCUMENTS

| | | | |
|---|---|---|---|
| 2619584 | 11/1977 | Germany | 43/122 |
| 0394693 | 12/1965 | Switzerland | 43/122 |

*Primary Examiner*—P. Austin Bradley
*Assistant Examiner*—James Miner

[57] ABSTRACT

An insect trap contains a liquid insect attractant which is fully enclosed so that the trap may be shipped without spillage or loss. The trap includes an enclosure which provides a funnel shaped portion terminating in a substantially translucent nipple. The insect trap may be commissioned into service by piercing the nipple thereby creating an inlet into the interior chamber through which insects will be drawn by the liquid attractant. The nipple is formed by a thermal process so that the walls of the inlet are drawn thin creating translucent walls which form a bright spot of light larger than the inlet's opening, thereby making it difficult for trapped insects to find the opening and gain freedom. Except for the terminal portions of the inlet, the enclosure is substantially opaque so that the contents of the insect trap are not visible to the public.

5 Claims, 1 Drawing Sheet

5,490,349

INSECT TRAP WITH LIQUID ATTRACTANT

BACKGROUND OF THE INVENTION

This invention pertains to insect traps and more particularly pertains to insect traps that use a translucent inlet and a liquid attractant.

The prior art discloses several insect traps that use inverted glass cones or flues which are translucent or transparent inlets. Webb, U.S. Pat. No. 119,435, discloses a trap for roaches and mice that consists of a chamber having a funnel inlet. Hagen, U.S. Pat. No. 181,165, discloses a wooden trap having downwardly inclined glass surfaces leading to an opening into an interior chamber where roaches are trapped. Williams, U.S. Pat. No. 109,282, discloses a wooden box having a glass tubular member leading to an interior of the box. Meyer, U.S. Pat. No. 1,672,576, discloses an insect trap comprising a trapezoidal, box-like structure having downwardly extending glass panes which define an elongate slot communicating with an interior of the structure. Although the trap in Meyer was primarily designed for trapping wingless insects, Meyer also discloses that winged insects which fly around the vicinity of the bait may be captured and once they are within the trap they become confused and unable to find their way out by virtue of the light emitted through the glass sidewalls. All the foregoing patents use glass inlets which lead to an interior of an insect trap. All of the foregoing patents disclose insect traps which are of a substantial construction involving wood, glass, and metal. Some traps further having hinges and threaded covers. Thus, all of the foregoing patents disclose insect traps that are expensive to manufacture, fragile (due to the glass) and are bulky or unsightly. Furthermore, none of the above discussed patents discloses an insect trap that is suitable for use with manufacturer installed liquid insect attractants because the patents do not disclose any means for closing off or sealing their inlet. Thus, none of the above mentioned patents could be filled with a liquid insect attractant at a manufacturing facility and shipped to consumers without spilling unless special packaging was employed.

Lowder, U.S. Pat. No. 4,360,987, discloses an insect trap that contains a liquid attractant. Lowder discloses a two part insect trap having transparent walls wherein the parts may be dissembled for easy cleaning and for refilling the trap. Lowder does not disclose a means of sealing the inlets of the insect trap so that a manufacturer may fill the trap with liquid attractant and ship the trap to consumers. Furthermore, Lowder discloses an insect trap which has a transparent enclosure, which may produce some desired results with regard to keeping insects trapped, but would be very unsightly, making it impractical to use in places where it would be seen by people because dead and trapped bugs would be visible.

The present invention overcomes the deficiencies of the prior art by providing an inexpensive insect trap that may be filled with a liquid attractant at a manufacturing facility and securely sealed so that it may be shipped to consumers. The present invention also provides an inlet having translucent walls to make it difficult for insects to escape without the necessity of providing a glass inlet, while also providing an insect trap that is substantially opaque so that it is not visually distasteful to people.

SUMMARY OF THE INVENTION

The present invention comprises a two part enclosure that is preferably a thermoplastic material. A first piece of the enclosure defines an open chamber having an inwardly extending nipple. The nipple is formed by drawing out the enclosure material while it is heated so that the material stretches into a thin wall and is substantially translucent near its terminus. The open chamber of the enclosure may be partially filled with a liquid insect attractant and a second piece of the enclosure is sealingly joined with the first piece creating a fully enclosed internal chamber and encapsulating the liquid attractant within. As constructed, the insect trap is a water-tight enclosure so that the liquid attractant may be inserted at the manufacturing facility and shipped to consumers without leakage of the attractant.

The insect trap may be configured for use by piercing the terminus of the nipple thus creating an opening that leads to the interior chamber. The walls of the inlet proximate the opening are substantially translucent thereby making it difficult for trapped insects to find their way out of the chamber.

DETAILED DESCRIPTION OF A PREFERRED EMBODIMENT

Figure 1:
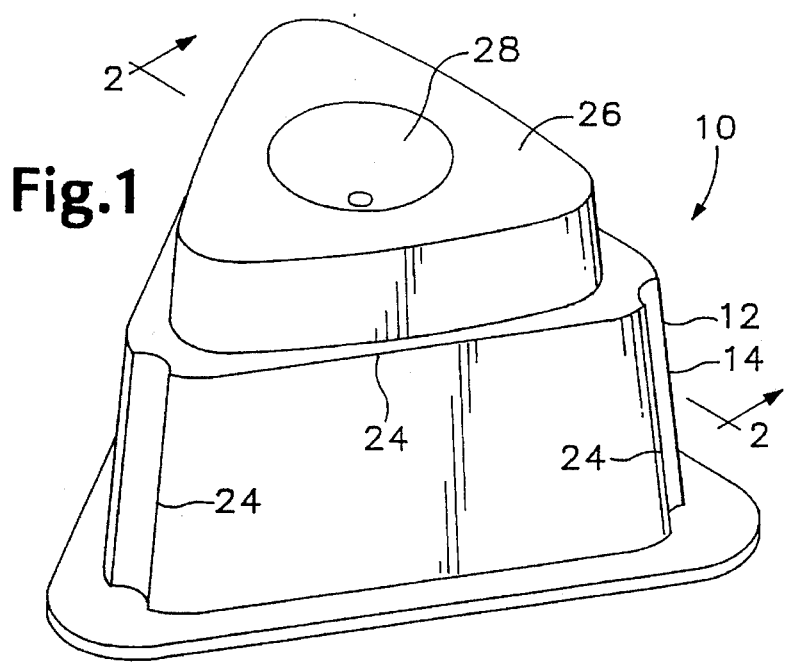
FIG. 1 is a perspective view of a preferred embodiment of an insect trap of the present invention.
Figure 2:
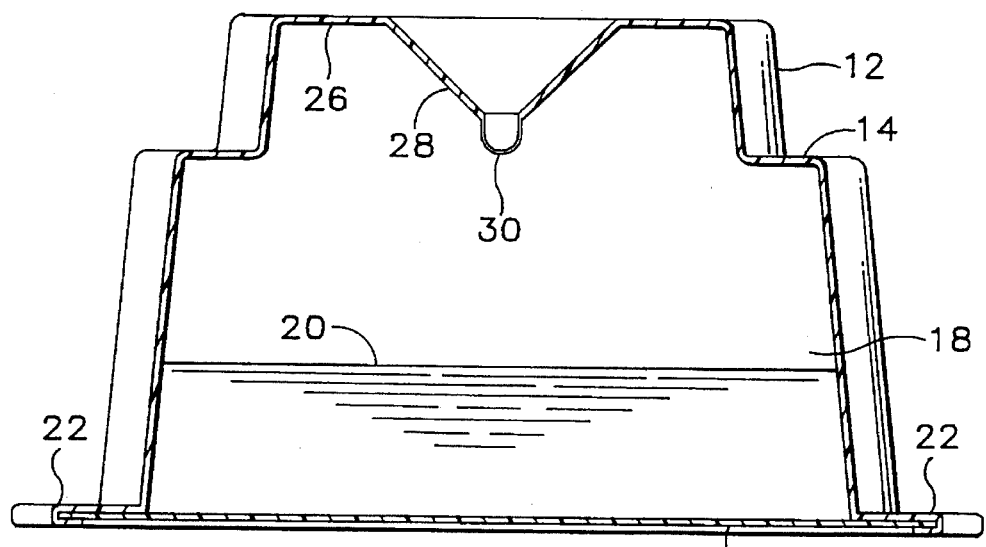
FIG. 2 is a sectional view taken along line 2—2 in FIG. 1.

A preferred embodiment of an insect trap 10 of the present invention is shown in FIGS. 1 and 2 and consists of a two piece enclosure 12 having a housing 14 and a base 16. The enclosure 12 defines an interior chamber 18 that holds a liquid insect attractant 20. Prior to being configured for use, the interior chamber is completely enclosed so that the liquid attractant 20 cannot escape from the enclosure regardless of the orientation of the trap.

Preferably, the enclosure is fabricated from a thermoplastic material that is vacuum formed into the desired shaped. Alternatively, the enclosure could be molded or machined. After the housing 14 has been formed, the liquid attractant 20 is poured into the upside down housing 14, and thereafter the base 16 is placed into position and sealed to the housing fully enclosing the liquid 20 within the chamber 18.

The housing 14 is preferably formed as a modified three-sided frustum of a pyramid having structural ridges, such as 24, a flat top surface 26, and a centrally located funnel portion 28. At the lower most portion of the funnel 28 is a nipple 30 which comprises an important feature of the present invention.

Figure 3:
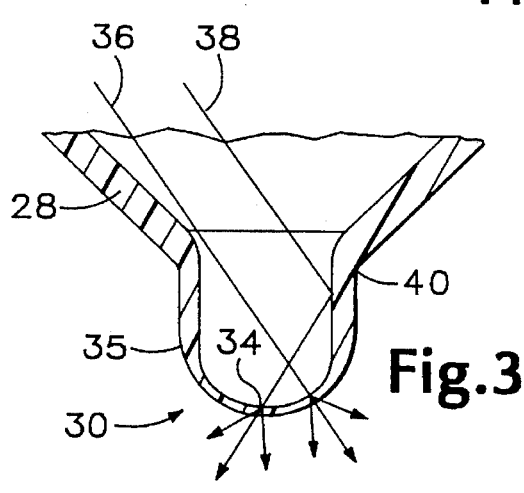
FIG. 3 is an enlarged sectional view of the nipple of the present invention.
Figure 4:
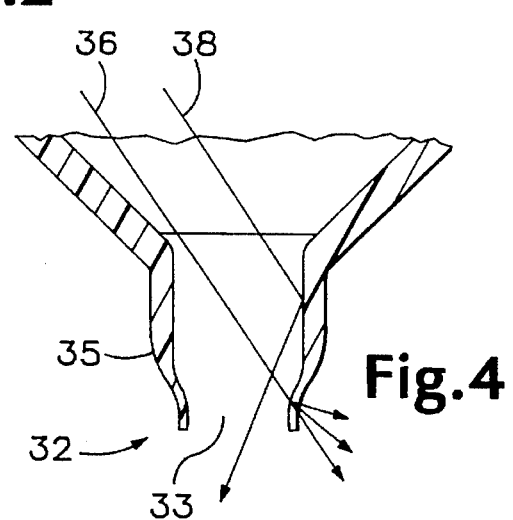
FIG. 4 is an enlarged sectional view of the inlet of the present invention.

The nipple 30 is shown in enlarged detail in FIGS. 3 and 4. FIG. 3 represents the nipple 30 in its manufactured configuration wherein the nipple 30 is intact with no breaks or openings in its walls 35. FIG. 4 represents the nipple after it has been pierced thereby forming an inlet 32 having an opening 33. An important feature of the nipple 30 is that it is fabricated by drawing out a portion of the enclosure material causing the walls 35 of the nipple to get progressively thinner towards its terminal end 34. It is drawn thin so that the material proximate the terminal end 34 becomes substantially more translucent than the remaining enclosure material. Light rays 36, 38 are shown for illustrative purposes to show the translucency of the walls 35. Light ray 36 is shown impinging directly upon an area near the terminal end 34 of nipple 30 and the light ray is shown diffusing as it passes through the wall 35 of the nipple 30. Light ray 38 is shown reflecting off a proximal end 40 where the wall 35 is substantially opaque and proceeding toward the terminal end 34 where it passes through the wall 35 and is diffused.

As stated, the insect trap 10 of the present invention is manufactured with the liquid attractant 20 located inside enclosure 12, which is fully sealed to prevent any spilling or escape of the attractant. When it is desired to use the insect trap for its intended purpose of trapping insects, it is necessary to pierce the terminal end 34 of nipple 30 to create an inlet 32. The nipple 30 may be pierced with a pointed object such as a pencil.

Piercing the nipple forms the inlet 32 so that insects which are attracted to the liquid attractant 20 will enter the chamber 18 through opening 33 and be trapped therein. The feature of the inlet 32, wherein the walls 35 are provided with greater translucency than the surrounding enclosure material, aides significantly in preventing the escape of insects from the chamber 18. It is well known in the art that insects which are trapped in an enclosure will seek freedom by flying towards a source of bright light. If the entire enclosure were opaque with the exception of a single opening at an inlet where light could enter the chamber, insects flying towards the bright source of light would find the opening and escape therethrough. However, the present invention provides an inlet 32 having walls 35 that are translucent, thereby providing an increased area of bright light. Thus, insects trying to escape from the chamber 18 will be attracted to the entire inlet area including the translucent walls. The light diffused through the walls 35 of the inlet 32 will serve to confuse insects trapped within chamber 18 thereby preventing their escape substantially more than if only the opening itself were brightly lit.

It should be noted that if the entire enclosure 12 were formed of a clear, transparent plastic, it would be difficult for insects trapped within the chamber 18 to escape because it would be nearly impossible for trapped insects to find the small opening through their sensitivity to light. However, if any substantial portion of the enclosure were clear then the contents of chamber 18 would be visible causing an unsightly appearance of dead and trapped insects floating on a liquid attractant. The present invention avoids that unsightly appearance by providing a liquid attractant in a substantially opaque enclosure while also providing a brightly lit area around the inlet, that is larger than the actual opening, for effectively trapping insects. The opacity of the enclosure permits use of the trap in areas where it would be seen by the public such as kitchens and fruit stands.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An insect trap, comprising:

(a) a substantially opaque enclosure defining a chamber;

(b) wherein a portion of said enclosure forms an inlet having a wall and defining an opening into said chamber wherein said wall is substantially translucent proximate said opening and substantially opaque where not proximate said opening;

(c) said inlet being funnel-shaped depending from said enclosure and having a tapered wall thickness that is least thick proximate said opening, said tapered wall thickness creating a gradient translucency.

2. The insect trap of claim 1, further comprising a liquid insect attractant in said chamber.

3. An insect trap, comprising a substantially opaque enclosure material that forms a solid surface defining a chamber and having an inverted nipple, extending into said chamber, that is formed from said enclosure material and a terminal portion of said nipple being substantially translucent, said chamber containing a liquid attractant wherein said liquid is completely enclosed by said solid surface enclosure.

4. An insect trap, comprising a substantially opaque enclosure material that forms a solid surface defining a chamber and having an inverted nipple, extending into said chamber, that is formed from said enclosure material and a terminal portion of said nipple being substantially translucent, said nipple having a pierced portion, said pierced portion defining an opening into said chamber.

5. The insect trap of claim 4 wherein said nipple has a wall with a tapered thickness such that the wall is thinnest at said terminal portion of said nipple.

\* \* \* \* \*